3,655,645
Patented Apr. 11, 1972

3,655,645
ESTERS OF ALKOXYLATED SACCHARIDES
Pierre Jacques, Tienen, Belgium, assignor to Raffinerie Tirlemontoise, Brussels, Belgium
No Drawing. Filed Nov. 28, 1967, Ser. No. 686,294
Claims priority, application Luxembourg, Dec. 2, 1966, 52,504; Nov. 17, 1967, 52,904
Int. Cl. C07c 69/32
U.S. Cl. 260—234 R    10 Claims

ABSTRACT OF THE DISCLOSURE

A process for the preparation of organic compositions comprising reacting simultaneously: one or more organic substances having one or more functional groups with a shiftable hydrogen, such as a saccharide; one or more organic substances with acid character and/or mineral salts or anhydrides thereof, such as a fatty acid or a fatty acid salt; and one or more oxyalkylation substances, such as an alkylene oxide or an alkylene imine, with or without a solvent is disclosed herein. The compositions prepared are useful, as for example, as a detergent.

---

This invention relates to a process for preparing new organic compositions, to compositions obtained by said process and to transformation products thereof.

Depending to substances used and proportions thereof, surface active compositions are obtained, which are detergent, wetting, emulsive, solubilising or antifoaming, and it is also possible to obtain plastifying or drying compositions.

Moreover, some of the compositions obtained can be used as starting materials for preparing new substances, such as, for example, for preparing alkyd resins or polyurethanes.

According to the invention, one or more organic substances having one or more functional groups with shiftable hydrogen, one or more organic substances with acid character and/or mineral salts or anhydrides thereof, and one or more oxyalkylation substances are reacted simultaneously, with or without solvent.

Organic substances comprising one or more functional groups with shiftable hydrogen are those substances which comprise said shiftable hydrogen appertaining to one or more of following group:

hydroxy group
thiol group
primary or secondary, aliphatic or aromatic amine group
amide or diamide group
imine group
carboxy group Organic substances comprising one or more functional groups having shiftable hydrogen appertaining to one or more hydroxy groups are substances of the class comprising: saccharides and derivatives thereof; alcohols and polyols and derivatives thereof; acid-alcohols; amino-alcohols; and phenols and polyphenols.

Amongst those saccharides suitable for participating in this reaction, use may be made of mono-, di-, tri- and polysaccharides, particularly glucose, fructose, saccharose, raffinose, melibiose, xylan, glycogen, dextrans and the like. Use may be made also of dried blackstrap molasses. In the case where saccharide is in a small proportion in the material used, use may also be made of saccharide as a concentrated aqueous solution; for example, in the case of saccharose, liquors or molasses issuing from manufacture or refining of sugar may be used, and also blackstrap molasses as such.

It is to be understood that the term "molasses" is not limited to the by-products obtained in the manufacture and refining of sugar, but that it must be taken in a wider sense. Any by-product of any manlfacture, provided that this by-prodlct contains a glucide or a saccharide, may be suitable. Mention may here be made for example of "hydrol molasses" and "citrus molasses."

Amongst the derivatives of saccharides, mention may be made of ethers, esters and ether-esters, such as, for example, pentaallylsaccharose, saccharose beta-cyanoethyl ether, saccharose acetate and benzoate, glucose diacetate, glucose tetraethyl ether, and glucose methyl ether acetate.

Amongst the alcohols, mention may for example be made of fatty alcohols; methyl, ethyl, propyl, butyl alcohols and the like; cyclic alcohols, such as cyclohexanol; aromatic alcohols, such as benzyl alcohol; and terpenic alcohols, such as geraniol and linalol.

Amongst the polyols which may be used, mention may be made of sorbitol, mannitol, pentaerythritol, inositol, sorbitan and so on.

Amongst the derivatives of polyols, mention may be made of ethers, esters and ether-esters, such as for example sorbitol acetate, allyl-mannitol and so on.

Amongst the amino-alcohols, mention may be made of aliphatic and aromatic amino-alcohols and derivatives thereof, containing one or more amine or alcohol groups, such as for example ethanolamine, diethanolamine, isopropanolamine, 2-aminophenol and so on.

Among the thiols, mention may be made of aliphatic thiols of 1 to 20 carbon atoms, thiophenol and the like.

Amongst the phenols and polyphenols, use may be made for example of mono-, di- and triphenols, cresols, xylenols and the like.

Organic substances comprising one or more functional groups with shiftable hydrogen appertaining to one or more amine groups are those substances with aliphatic or aromatic chain, bearing a primary or secondary amine group, and amino-acids. By way of example, mention may be made of aniline, propionamine, glycine, valine, glutamic acid and so on.

Organic substances having one or more functional groups with shiftable hydrogen appertaining to one or more amide groups are for eqample urea, acetamide, formamide, propionamide and so on.

Organic substances having one or more functional groups with shiftable hydrogen appertaining to one or more imine groups are for example pyrrolidine, propylene imine and the like.

Organic substances having one or more functional groups with shiftable hydrogen appertaining to one or more carboxy groups are mono-, di- and tricarboxylic acids, acid-alcohols and amino-acids. By way of example, mention may be made of citric, acetic, propionic, valerianic, butyric, benzoic, glutamic acids, tall-oil and the like.

Obviously, use may also be made of various mixtures of organic substances comprising functional groups with shiftable hydrogen of different kinds.

Organic substances with acid character are carboxylic, aliphatic or aromatic acids, phenols, thiophenols and thioacids, or substituted and/or added derivatives thereof, or mineral salts or anhydrides thereof.

By way of example, mention may be made of formic, acetic, propionic, valerianic, butyric, isobutyric, caproic, adipic, pimelic, caprylic, ricinoleic, palmitic, stearic, oleic, linoleic, lauric, myristic, cetylic acids; tall-oil; mixtures of fatty acids issuing from animal, vegetable and synthetic greases and oils; glutamic acid; glycine; citric, tartaric, benzoic, benzopropionic acids; phenol; cresols, thiophenol; thioacetic, thiopropionic, thiophenic, monobromostearic, monohydrostearic, nitrobenzoic, 10,12-dihydrostearic, 12-cetostearic acids; bromophenol; alkaline salts of fatty acids, particularly soaps, phenates and the like; anhydrides of acetic, propionic, valerianic, butyric, benzoic, critic, tartaric acids and the like.

Use may also be made of various mixtures of the substances mentioned hereinbefore, for example mixtures of such substances with acid character, or also mixtures of an acid and a salt thereof, mixtures of an acid and the anhydride thereof, mixtures of an acid, the salt thereof and the anhydride thereof, and so on.

Oxyalkylation substances are alkylene oxides and alkylene imines.

Amongst the alkylene oxides, mention may be made particularly of ethylene, propylene or butylene oxides, or a mixture thereof.

Instead of an alkylene oxide, use may also successfully be made of an alkylene imine, such as ethylene imine, propylene imine or butylene imine or a mixture thereof. Also use may be made of a mixture of one or more alkylene oxides and one or more alkylene imines.

The reaction according to the invention may be carried out in the absence of a catalyst, one of the reactants then acting as such a catalyst, for example in the case where one of the reactants is an alkaline soap or a mixture of a fatty acid and an alkaline soap.

However, it may be desirable to carry out the reaction in the presence of a catalyst.

Suitable catalysts are bases and basic salts, and mineral or organic acids and acid salts.

Amongst the acid catalysts, mention may be made for example of protonic acids $HCl$, $SO_2$, $H_3BO_3$, $(COOH)_2$, cationic residues, and Lewis acids $AlCl_3$, $BF_3$ and so on.

Amongst the basic catalysts, mention may be made of mineral or organic bases and basic salts (tertiary cyclic or tertiary aliphatic amine, nitrogenous heterocyclic of pyridine, lutidine, collidine, morpholine type and the like), and also anionic resins.

Advantageously, addition of alkylene oxide or alkylene imine is made under pressure, but thereafter reaction can be made at ordinary pressure and even be continued under vacuum.

It is to be noted that in many cases the presence of a small amount of water is not detrimental to the reaction and even may be revealed as favourable.

EXAMPLE 1

Into an autoclave, are added 200 g. of oleic acid and 5 g. of KOH which are heated to 145° C. Then are added 360 g. of saccharose. The autoclave is purged with nitrogen, then with propylene oxide and 440 g. of propylene oxide are reacted under a pressure of 6 kg./cm.$^2$. The reaction is complete when the pressure has fallen to zero. Thus a surface active composition is obtained, which is detergent.

EXAMPLE 2

The process is as described in Example 1, but instead of 440 g. of propylene oxide, 780 g. of the latter are added. A composition is obtained, which after neutralisation reacts with a diisocyanate in the presence of an organic basic catalyst, for example triethylamine, and of a swelling agent, for example trichlorofluoromethane, which gives a rigid polyurethane foam.

EXAMPLE 3

600 g. of potassium oleate are charged into an autoclave and are heated to 130° C. Then, 342 g. of saccharose are added and thereafter the process is as described as in Example 1 in order to add 620 g. of propylene oxide, under a pressure of 4 kg./cm.$^2$.

A surface active composition is obtained, which is emulsive (oil in water).

EXAMPLE 4

Into an autoclave, 400 g. of fatty acids issuing from treatment of linseed oil and 10 g. of KOH are charged and heated to 120° C. Then, 360 g. of saccharose are added, the autoclave is purged with nitrogen, then with ethylene oxide and 480 g. of ethylene oxide are added under a pressure of 5 kg./cm.$^2$.

A drying composition is obtained which gives an alkyd resin through a further reaction with phthalic anhydride.

EXAMPLE 5

Into an autoclave are charged 360 g. of fatty acid issuing from treatment of tallow, 200 g. of isobutyric acid and 18 g. of triethylamine and the contents of autoclave is heated to 110° C. Then, 343 g. of saccharose are admitted. The autoclave is purged with nitrogen and propylene oxide and 623 g. of propylene oxide are reacted under a pressure of 8 kg./cm.$^2$. A plastifying composition is obtained which is decolourised by known means.

EXAMPLE 6

Into an autoclave are charged 342 g. of saccharose, 1,632 g. of benzoic acid and 20 g. of $CH_3ONa$ and the autoclave is purged with nitrogen and propylene oxide with heating to 110° C.; then 500 g. of ethylene oxide are added under a pressure of 4 kg./cm.$^2$ and a composition is obtained which is a very good plastifier after purification by known means.

EXAMPLE 7

Into an autoclave are charged 342 g. of saccharose, 200 g. of propionic acid and 1,160 g. of isobutyric acid, and 13 g. of $CH_3ONa$. The autoclave is purged with nitrogen, then with propylene oxide and the mixture is heated to 120° C., after which 700 g. of propylene oxide are added under a pressure of 7 kg./cm.$^2$. A composition is obtained which being purified by known means is an excellent plastifier.

EXAMPLE 8

340 g. of glycerol, 150 g. of propylene glycol, 660 g. of fatty acid obtained from treatment of copra, and 11 g. of KOH are charged into an autoclave which is heated to 110° C. and purged with nitrogen and ethylene oxide. Then 1,100 g. of ethylene oxide are reacted under a pressure of 5 kg./cm.$^2$. A detergent surface active composition is obtained.

The composition obtained when treated with a diisocyanate gives a flexible foam of polyurethane.

EXAMPLE 9

53 g. of diethanolamine, 102 g. of fatty acid obtained from treatment of coconut oil and 3 g. of KOH are charged into an autoclave which is purged with nitrogen, then with ethylene oxide. Finally, 212 g. of ethylene oxide are added under a pressure of 5 kg./cm.$^2$.

The composition obtained is detergent.

EXAMPLE 10

An autoclave is charged with 220 g. of tall-oil and 7 g. of KOH and heated to 135° C., then 360 g. of saccharose are added. The autoclave is purged with nitrogen, then with propylene oxide and 440 g. of propylene oxide are reacted under a pressure of 3 kg./cm.$^2$. A surface active composition is obtained which is detergent.

EXAMPLE 11

Into an autoclave are charged 100 g. of tall-oil, 130 g. of oleic acid and 5 g. of KOH. The autoclave is heated to 130° C. and purged with nitrogen, then with ethylene oxide. Thereafter, 250 g. of ethylene oxide are admitted and reacted under a pressure of 4 kg./cm.$^2$.

A detergent surface active composition is obtained.

EXAMPLE 12

Into an autoclave are charged 700 g. of palmitic acid, 10 g. of KOH and 120 g. of saccharose. The mixture is heated to 120° C., the autoclave is purged with nitrogen, then with ethylene oxide and 180 g. of ethylene oxide are reacted under a pressure of 3 atmospheres. An emulsive composition of the water in oil type is thus obtained.

EXAMPLE 13

Into an autoclave are charged 200 g. of saccharose, 15 g. of KOH and 300 g. of oleic acid. The mixture is heated to 115° C., the autoclave is urged with nitrogen, then with propylene oxide and 1,500 g. of propylene oxide are reacted under a pressure of 4 atmospheres. A solubilising agent is thus obtained.

EXAMPLE 14

150 g. of maltose, 8 g. of KOH and 700 g. of a mixture of fatty acids obtained from treatment of tallow are charged into an autoclave. The mixture is heated to 130° C., the autoclave is purged with nitrogen, then with ethylene oxide and finally 150 g. of ethylene oxide are reacted under a pressure of 3 atmosphers. A wetting composition is thus obtained.

EXAMPLE 15

Into an autoclave are added 80 g. of saccharose, 10 g. of KOH and 550 g. of fatty acids obtained from treatment of tallow. The mixture is heated to 120° C., the autoclave is purged with nitrogen, then with propylene oxide and 370 g. of propylene oxide are reacted under a pressure of 3 kg./cm.². An antifoaming composition is thus obtained.

EXAMPLE 16

230 g. of saccharose as raw sugar, 10 g. of KOH and 540 g. of palmitic acid are charged into an autoclave. The mixture is heated to 115° C., the autoclave is purged with nitrogen, then with ethylene oxide. 100 g. of ethylene oxide are reacted, then 130 g. of propylene oxide under a pressure of 4 kg./cm.². An antifoaming composition is thus obtained.

EXAMPLE 17

Into an autoclave are charged 70 g. of a liquor at 71° Brix, 8 g. of KOH, 400 g. of palmitic acid and 350 g. of oleic acid. The mixture is heated to 135° C., the autoclave is purged with nitrogen, then with ethylene oxide and 200 g. of ethylene oxide are reacted under a pressure of 2 kg./cm.². An antifoaming composition is thus obtained.

EXAMPLE 18

Into an autoclave are charged 200 g. of blackstrap molasses from sugar-works, 8 g. of KOH and 650 g. of a mixture of fatty acids obtained from treatment of tallow. The mixture is heated to 130° C. and the autoclave is purged with nitrogen, then with propylene oxide. 250 g. of propylene oxide are then reacted under a pressure of 4 kg./cm.². An antifoaming composition is thus obtained.

EXAMPLE 19

342 g. of saccharose, 5 g. of KOH and 135 g. of a mixture of fatty acids obtained from treatment of tallow are charged into an autoclave. The mixture is heated to 150° C. and the autoclave is purged with nitrogen, then with propylene oxide. Then, 392 g. of propylene oxide are reacted under a pressure of 4 kg./cm.². A detergent composition is thus obtained.

EXAMPLE 20

The process is as described in Example 19. Then, after addition of propylene oxide, 156 g. of ethyl oleate are added which are allowed to react for 1.5 hours at 125° C. under a pressure of 30 mm. Hg. An improved detergent composition is thus obtained.

EXAMPLE 21

Into an autoclave are charged 342 g. of saccharose, 5 g. of KOH and 110 g. of a mixture of fatty acids obtained from treatment of coconut butter. The mixture is heated to 150° C. and the autoclave is purged with nitrogen, then with ethylene oxide. 440 g. of ethylene oxide are then added under a pressure of 3 atmospheres. A detergent composition A is obtained, the detergent power of which can be improved as follows: after addition of ethylene oxide, 107 g. of methyl laurate are added which are allowed to react for 2 hours at 140° C. under a pressure of 20 mm. Hg, which gives the detergent composition B. Thereafter, the autoclave is purged again with nitrogen, then with ethylene oxide, and 352 g. of ethylene oxide are again added so as to obtain the detergent composition C.

EXAMPLE 22

Into an autoclave are added 251 g. of saccharose, 5 g. of KOH and 200 g. of a mixture of fatty acids obtained from treatment of tallow. The mixture is heated to 145° C. and the autoclave is purged with nitrogen, then with propylene oxide. 215 g. of propylene oxide are added, then 334 g. of ethylene oxide under a pressure of 4 atmospheres. A detergent composition is thus obtained.

EXAMPLE 23

Into an autoclave are charged 225 g. of saccharose, 5 g. of KOH and 179 g. of lauric acid. The mixture is heated to 145° C. and the autoclave is purged with nitrogen, then with ethylene oxide. Thereafter, 212 g. of ethylene oxide are added, then 384 g. of propylene oxide under a pressure of 4 atmospheres. A detergent composition is thus obtained.

From examples given hereinbefore, it is clearly apparent that according to the type and proportions of constituents used, detergent, emulsive of water in oil or oil in water type, wetting, solubilising, plastifying, drying and antifoaming compositions are obtained and also starting materials for preparing alkyd resins or polyurethanes.

In Table 1, proportions of constituents are given, which are used for obtaining either type of detergent, emulsive of the water in oil type, emulsive of the oil in water type, wetting, solubilising or antifoaming compositions, the organic substances with acid character having from 6 to 30 carbon atoms in said cases.

TABLE 1

| Components | Detergent | Emulsive water in oil | Emulsive oil in water | Wetting | Solubilising | Antifoaming |
|---|---|---|---|---|---|---|
| A | 15-50 | 8-16 | 10-45 | 5-20 | 5-15 | 5-25 |
| B | 25-75 | 12-24 | 20-60 | 15-35 | 65-85 | 10-40 |
| C | 10-35 | 60-80 | 5-65 | 60-75 | 5-20 | 50-80 |

A: Substances having at least one functional group with shiftable hydrogen.
B: Alkylene oxides, alkylene imines.
C: Organic substances with acid character.

The detergent compositions obtained according to the invention are non-ionic and non-foaming. They are also non-toxic and easily biodegradable. They can be combined with one or more conventional detergency aids (sodium tripolyphosphate, sodium silicate, sodium carbonate, carboxymethyl cellulose, and the like) so as to give detergent powders or liquid detergents. They are particularly suitable for manufacturing toilet soaps, lotions and shampoos.

By way of example, detergent power of some detergent compositions obtained by the process of the invention is given in Table 2.

The detergency determination was made by means of 10 x 10 mm. bands of dirty fabric Krefeld. The reflectance measures were made with the spectrophotometer Unicam SP 500 with attachment SP 540 (diffuse reflectance attachment). Water used for said tests (washing and rinsing) had a hardness of 41° F. (1° F.=10 mg. of CaCO₃/litre).

The concentration of surface active agent was 0.15 g./litre.

The washing conditions were:
temperature: 50° C.
duration: 20 minutes
rinsing (with hard water 41° F.) at 50° C.: 5 minutes
stove drying at 70° C.: 30 minutes

TABLE 2

| | Percent constituents used | | | |
|---|---|---|---|---|
| | Percent saccharose | Percent fatty acids | Percent propylene oxide | Reflectance value |
| Detergent composition obtained in Example No.: | | | | |
| 19 | 39.3 | 15.5 | 45.2 | 51 |
| 20 | 33.3 | 28.5 | 38.2 | 52 |
| | 44.6 | 17.6 | 33.8 | 48.4 |
| | 37.8 | 30 | 32.2 | 46.2 |
| | | | Percent ethylene oxide | |
| 21A | 38.3 | 12.3 | 49.4 | 52 |
| 21B | 34.3 | 21.7 | 44 | 52 |
| 21C | 25.3 | 16 | 58.7 | 56.8 |
| | 36.6 | 29 | 34.4 | 46.4 |
| | | | Percent ethylene oxide+ percent propylene oxide | |
| 22 | 25.1 | 20 | ¹ 21.5 ² 33.4 | 55.2 |
| 23 | 22.5 | 17.9 | ¹ 38.4 ² 21.2 | 55 |
| Magnesia | | | | 100 |
| Dirty fabric Krefeld | | | | 39.5 |

¹ P.O.
² E.O.

With respect to antifoaming compositions according to the invention, they can be used as such, as a water emulsion or as a solution in a liquid hydrocarbon, such as light fuel, gas oil, navy fuel, paraffinic hydrocarbons or any other solvent, for example ethanol, fusel oils, vegetable or animal oils and the like.

Table 3 gives antifoaming powers and resistance times of antifoaming compositions of Examples 5 to 8 and of other antifoaming compositions prepared according to the invention.

The antifoaming powers and resistance times were determined according to the method described in the article "Uber ein einfaches Verfahren zur Prüfung von Entschaümern," published by Dr. C. Fischer in "Zücker," Mar. 1, 1953, pp. 92–94.

According to this method:

(a) The antifoaming power is measured by the weight in grams of antifoaming material, which must be added to 1 litre of test liquid so as to completely prevent foam formation;

(b) The resistance time of an antifoaming material is the time in minutes, at the end of which foams begin to appear again, said antifoaming material having no more effect.

Antifoaming tests involved were made at 20° C. with diluted blackstrap molasses at 15° Brix and pH 12.5 as test liquid.

TABLE 3

| Antifoaming composition | Percent constituents used | | | Form used | Antifoaming power, g. | Resistance times minute |
|---|---|---|---|---|---|---|
| | Percent saccharose | Percent fatty acids | Percent propylene oxite | | | |
| A | 8 | 55 | 37 | As such | 0.057 | 15 |
| | | | | 10% in water | 0.64 | 32 |
| | | | | 10% in hydrocarbons | 0.51 | >60 |
| B | 12 | 61 | 27 | As such | 0.07 | 13 |
| | | | | 10% in water | 0.65 | 25 |
| | | | | 10% in hydrocarbons | 0.81 | >60 |
| C | 10 | 65 | 25 | As such | 0.056 | 28 |
| | | | | 10% in water | 0.52 | 35 |
| | | | | 10% in hydrocarbons | 0.51 | >60 |
| D | 21 | 48 | 31 | As such | 0.074 | 23 |
| | | | | 10% in water | 0.60 | 23 |
| | | | | 10% in hydrocarbons | 0.88 | >60 |
| E | 15 | 70 | 15 | 10% in hydrocarbons | 0.99 | >60 |
| F | 5 | 75 | 20 | As such | 0.066 | 15 |
| | | | Percent ethylene oxide | | | |
| G | 10 | 54 | 36 | 10% in hydrocarbons | 0.90 | >06 |
| H | 13 | 75 | 12 | As such | 0.08 | 10 |
| | | | Percent propylene oxide+ Percent ethylene oxide | | | |
| I | 23 | 54 | ¹ 13 ² 10 | As such | 0.08 | 12 |

¹ P.O.
² F.O.

As it is apparent from Table 3, antifoaming compositions according to the invention are very active. The antifoaming power is very high and the resistance time is very long, which ensures a minimum consumption. Furthermore, due to the advantageous prices of starting materials used and the ease to prepare the latter, products obtained are economically advantageous.

Due to their non-toxicity, the antifoaming compositions according to the invention are quite suitable for alimentary industries.

Thus said products were successfully tested in sugar manufacture, particularly with flume waters, at the diffusion stage, in the preliming operation, in vacuum pans, in desugarization of molasses, in distillery plant and in yeast producing plant.

I claim:
1. A process for preparing organic compositions comprising simultaneously reacting
    (1) one or more hydroxy containing compounds selected from the group consisting of
        (a) saccharides,
        (b) lower aliphatic ethers, esters, ether-esters, and benzoates of said saccharides, and
        (c) mixtures of (a) and (b),
    (2) one or more organic acid compounds selected from the group consisting of
        (a) carboxylic acids and mixtures thereof,
        (b) mineral salts of carboxylic acids and mixtures thereof, and
        (c) mixtures of (a) and (b), and
    (3) one or more alkylene oxides and mixtures thereof, said alkylene chain having from 2 to 4 carbon atoms.
2. The process of claim 1, wherein said hydroxy containing compound is a saccharide, wherein said organic acid compound is a carboxylic acid and wherein said alkylene oxide is selected from the group consisting of ethylene oxide, propylene oxide, butylene oxide and mixtures thereof.
3. The process of claim 2, wherein said acid is selected from the group consisting of monocarboxylic acids, dicarboxylic acids and tricarboxylic acids having from 1 to 30 carbon atoms.
4. The process of claim 2, wherein said saccharide is selected from the group consisting of monosaccharides, disaccharides, trisaccharides and polysaccharides.
5. The process of claim 2, wherein said saccharide is dried molasses.
6. The process of claim 2, wherein said organic acid is a mixture of fatty acids obtained from vegetable, animal or synthetic greases and oils.
7. The process of claim 2, wherein a portion of said carboxylic acid is replaced by the sodium or potassium salts of said acids.
8. The process of claim 1, wherein said reaction is conducted in the presence of an acid or a basic catalyst.
9. The process of claim 1, wherein the reaction is conducted under pressure.
10. The process of claim 1, wherein the addition of the alkylene oxide is made under pressure and then the reaction is achieved at atmospheric pressure or under vacuum.

References Cited

UNITED STATES PATENTS

| | | | |
|---|---|---|---|
| 3,018,282 | 1/1962 | Crecelius | 260—234 |
| 3,102,114 | 8/1963 | Komori et al. | 260—234 |
| 3,435,024 | 3/1969 | Nobile et al. | 260—234 |
| 3,459,733 | 8/1969 | Byrd et al. | 260—234 |

LEWIS GOTTS, Primary Examiner

J. R. BROWN, Assistant Examiner

U.S. Cl. X.R.

106—162, 252; 252—89, 135, 137, 139, 182, 321, 351, 356, 358, 363.5; 260—2.5 R, 75 R, 210 R, 234 D, 410.5, 410.6, 410.7, 468 R, 469, 470, 475 R, 478, 481 R, 482 R, 484 R, 485 R